(12) United States Patent
Lection et al.

(10) Patent No.: US 6,446,110 B1
(45) Date of Patent: Sep. 3, 2002

(54) METHOD AND APPARATUS FOR REPRESENTING HOST DATASTREAM SCREEN IMAGE INFORMATION USING MARKUP LANGUAGES

(75) Inventors: David Bruce Lection; Yongcheng Li; Yih-Shin Tan, all of Raleigh, NC (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/286,278

(22) Filed: Apr. 5, 1999

(51) Int. Cl.[7] ............................................. G06F 15/16
(52) U.S. Cl. .................... 709/203; 709/200; 709/201; 709/202; 709/246; 707/10; 707/513; 707/523
(58) Field of Search ........................ 709/200, 201–203, 709/217–219, 223–224, 245–246; 707/10, 513, 522–523

(56) References Cited

U.S. PATENT DOCUMENTS

| | | | | |
|---|---|---|---|---|
| 5,903,724 A | * | 5/1999 | Takamoto et al. ........... 709/200 |
| 6,012,098 A | * | 1/2000 | Bayeh et al. ................ 709/203 |
| 6,154,738 A | * | 11/2000 | Call .............................. 707/513 |
| 6,209,124 B1 | * | 5/2001 | Vermeire et al. ............ 707/513 |
| 6,249,844 B1 | * | 6/2001 | Schloss et al. .............. 709/203 |
| 6,286,033 B1 | * | 9/2001 | Kishinsky et al. .......... 709/203 |
| 6,336,124 B1 | * | 1/2002 | Alam et al. .................. 707/523 |

* cited by examiner

*Primary Examiner*—Bharat Barot
(74) *Attorney, Agent, or Firm*—Jeanine S. Ray-Yarletts; Carstens, Yee & Cahoon, LLP

(57) ABSTRACT

A method and apparatus for representing host datastream screen image information using markup languages is provided. A distributed data processing system contains a network, at least one host computer, at least one client computer, and optionally at least one server. The host computer generates a host datastream containing host screen image information and forwards the host datastream to a client. If the client is not directly connected to the host, then the host datastream may be routed to the client. The host datastream is converted to a markup language tagged datastream at some point within the network according to a Document Type Definition (DTD) authored for the purpose of representing information in host datastreams. The client receives the markup language tagged datastream containing the host screen image information derived from the host datastream and parses the markup language tagged datastream to identify the host screen image information. The host screen image information is displayed on a display device connected to the client, enabling the client to act as an emulator for the host.

29 Claims, 19 Drawing Sheets

FIG. 10A

<!-- A host datastream, e.g., 3270 terminal, typically describes a rectangular. presentation space that can be viewed as a character-based structure of fields. Parsing of the datastream is a major task of a typical host datastream emulation application. The information is kept in several internal data structures to support the rendering of the presentation space and interactions between the two ends of the datastream. On the end-user side, it appears most commonly as a programmable interactive display window. On the host side, it appears mostly in various forms of data structures, such as mapping macros, copybooks, and panels, as programming interfaces for host software such as ISPF, DB2, CICS, and IMS. The following XML tags provide a common format fox presentation space contents with the natural filtering of host data from its legacy rendering attributes. XML solution developers can focus on integrating host data with their solutions while traditional host application interactive capability is preserved.-->

<!-- The xml host data element:-->
<!-- An xml_host_data document contains a session element followed by a screen element. The session represents a connection to a host and the screen represents the data content exchanged between the host and a user at any given point of time. -->
<!ELEMENT xml host data (session, screen)>

<!-- The session element: -->
<!-- A session element contains three subelements in the sequence of
id, description, and host to describe the characteristics of the session- -->
<!ELEMENT session (id, description, host)>

<!-- An id element contains a character data element as the session
        identifier -->
<!ELEMENT id (#PCDATA)>
<!-- Every id has a type attribute value indicating its session type, which is one of the following=
3270, 5250, CICSGW, and VT. If a value is not specified for this attribute, it defaults to 3270-->
<!ATTLIST id
        type (3270|5250|CICSGW|VT) "3270°>

<!-- A host element contains a character data element specifying a valid IP host name -->
<!ELEMENT host (#PCDATA)>
<!-- Every host element has two attribute values that must be specified:
port -valid IP port number for this host
size -valid presentation space size for defined session types

|        | 3270 | 5250 | VT | CICSGW |
|--------|------|------|----|--------|
| 24x80  | v    | v    | v  | v      |
| 32x80  | v    |      |    | v      |
| 43x80  | v    |      |    | v      |
| 27x132 | v    | v    |    | v      |
| 24x132 |      |      | v  |        | -->

<!ATTLIST host
    port CDATA #REQUIRED
    size CDATA #REQUIRED>
<!-- A description element contains a character data element specifying the descriptive information of this session -->
<!ELEMENT description (#PCDATA)>
<!-- end of the session element -->

FIG. 10B

```
<!--The screen element: -->
<!-- A screen element contains three subelements in the sequence of content, interaction, and an optional display element -->
<!ELEMENT screen (content, interaction, display?)>

<!--A Content element contains one or more field elements mimicking the
     legacy host datastxeam format-->
<!ELEMENT content (field+)>

<!-- A field element contains a character data element specifying its textual content -->

<!ELEMENT field (#PCDATA)>
<!-- Every field element has a list of attribute values consisting of the original host datastream type
field attributes (indicated by "H") and additional values fox starting position, length, and clearing of
field before modification:

-values for 3270 host datastream type
        position    - required, indicates the starting position of the field
        length      - required, indicates the length of the field
        protected (H)- required, "yes|no" indicates an input field
        numeric   (H)- optional, "yes|no" indicates numerical data,
                        default is "no"
        selectable (H)- optional, "yes|no" indicates pen selectable field,
                        default is "no"
        hidden     (H)- optional, "yes|no" indicates non-displayable field,
                        default is "no"
        reserved   (H)- optional, "yes|no" indicates reserved setting is used
                        default is "no"
        modified   (H)- optional, "yes|no" indicates field was modified,
                        default is "no"
        reset       - optional, "yes|no" indicates reset field before modifying
                        default is "no" -->
<!ATTLIST field
        position CDATA #REQUIRED
        length CDATA #REQUIRED
        protected (true|false) "false"
        number (true|false) "false"
        selectable (true|false) "false"
        hidden (true|false) "false"
        reserved (true|talse) "false"
        modified (txue|false) "false"
        reset (true|false) "false">
```

FIG. 10C

```
<!-- An interaction element contains one action element mimicking the legacy inbound host
datastream action, or zero or more action_to_select elements to supplement legacy outbound
host datastream with inbound actions filtering capability -->
<!ELEMENT interaction (action|action_to_select*)>

<!-- An action element contains a character data element specifying the descriptive text for the
action -->
<!ELEMENT action (#PCDATA)>
<!-- Every action element has two required attributes:
    type    -indicating a valid action type the host application will recognize. The only value that
            can be specified now is "key", which stands for host datastream defined Attention
            IDentifier(AID)keys
    cap     -specifying an AID key value of the host datastream type
            -values for 3270 host datastream type
    attn    -Attention AID key
    clear   -Clear AID key
    enter   -Enter AID key
    sysreq  -Selector Request AID key
    cursel  -Selector Pen Attention AID key
    pf1~24  -Program Function AID keys 1-24
    pa1~3   -Program Attention AID keys 1-3

-->
<!ATTLIST action
    type (key) #REQUIRED
    cap CDATA #REQUIRED>

<!-- An action_to_select element follows the same rule as the action element above -->
<!ELEMENT action to select (#PCDATA)>
<!-- The action_to_select element and its attributes:-->
<!ATTLIST action_to_select
    type (key) #REQUIRED
    cap CDATA #REQUIRED>
```

FIG. 10D

```
<!-- A display element contains three subelements in the sequence of background, foreground, and
exfield. All are based on the content rendering attributes defined for the host datastream type.
Together they represent a host application's intent of the coloring and hiliting schemes to apply
when displaying of screen content- -->
<!ELEMENT display (background, foreground, exfield)>

<!-- A background element contains a character data element specifying the background
colors intended for the screen content by the host application. Each character value
indicates an intended background color for the corresponding text character, in the
screen content as       follows:
        0x0   Blank
        0x1   Blue
        0x2   Green
        0x3   Cyan
        0x4   Red
        0x5   Magenta
        0x6   Brown (3270), Yellow (5250)
        0x7   White          -->
<!ELEMENT background (#PCDATA)>

<!-- A foreground element contains a character data element specifying the foreground
colors intended for the screen content by the host application. Each character value
indicates an intended foreground color for the corresponding text character in the
screen content as follows:
        0x0   Blank
        0x1   Blue
        0x2   Green
        0x3   Cyan
        0x4   Red
        0x5   Magenta
        0x6   Brown (3270), Yellow (5250)
        0x7   White (normal intensity)
        0x8   Gray
        0x9   Light blue
        0XA   Light green
        0XB   Light cyan
        0xC   Light red
        0xD   Light magenta
        0XE   Yellow
        0xF   White (high intensity) -->
<!ELEMENT foreground (#PCDATA)>
```

FIG. 10E

```
<!--  A exfield element contains a character data element specifying
      the extended attributes of the host datastream type intended
      for the screen content by the host application. Each character
      value is an intended extended attribute for the corresponding
      text character in the screen content as follows:
      -values for 3270 host datastream type
      Bit Position        Meaning
      (0 is least significant bit)
      7,6                 Character highlighting
                          0,0 Normal
                          0,1 Blink
                          1,0 Reverse video
                          1,1 Underline
      5,4,3               Character color
                          0,0,0 Default
                          0,0,1 Blue
                          0,1,0 Red
                          0,1,1 Pink
                          1,0,0 Green
                          1,0,1 Turquoise
                          1,1,0 Yellow
                          1,1,1 White
      2,1                 Character attribute
                          0,0 Default
                          1,1 Double-byte character
      0                   Reserved   -->
<!ELEMENT exfield (#PCDATA)>

<!-- end of the screen element -->
<!-- end of the xml_host_data element -->
```

| | | | |
|---|---|---|---|
| 05C7 11 5D6B | 1D60 | D9E4D5D5C9D5C7404040D9C1D3E5D4E2404040 | |
| _1202_ | | <RUNNING RALVMS > | |
| | 1DE8 | E50461C5Z2Ci40D605D3C9C5 | |
| | | <VM/ESA ONLINE> | |
| _1204_ | 1D60 | | |
| | | <> | |
| 11 C1D1 | IDFO | 404040404040404040404040404040404040 | |
| | | < > | |
| _1206_ | 1DF8 | E6C5D3C3D6D4C540E3D640C9C2D440C7D3D6C2C1C3 | |
| | | 40E2C5D9E5C9C3C5240404040404040404040404040 | |
| | | 4040404040404040 | |
| | | <WELCOME TO IBM GLOBAL SERVICES > | |
| 11 C261 | | 4040404040404040404040404040404040 | |
| | | < > | |
| | 1DF0 | 6D6D6D40 | |
| | | <___> | |
| | 1DF8 | D9D9D94040 | _1208_ |
| | | <RRR > | |
| | ID40 | D9C3C840E3D9C9C1D5C703C540D7C1D9D2 | |
| | | <RESEARCH TRIANGLE PARK> | |
| | IDFO | 6D,5D606D6D606D6D606D6D6D6D4S40404040404040 | |
| | | <_____ . > | |
| 11 C3F1 | | 4040404040404040404040404040 | |
| | | < > | |
| | 1DFO | 616D6D6040 | |
| | 1DF8 | D94040D9 | |
| | | <R R> | |
| | 1D40 | D9 ......... | |

FIG. 13A

```xml
<?xml version="1.0" encoding="ISO-8859-1"?>
<xml host data>
    <session>
        <id type="1">Session A</id>
        <description> </description>
        <host port="23">ralvms</host>
        <size>2</size>
    </session>
    <screen>
        <content>
<field position="2" length"13" protected="true" numeric=" false" hidden=" false" reset="false" modified="false">VM/ESA ONLINE</field>
<field position="16" length-="67" protected=" true" numeric= "false" hidden=" false" reset="false" modified="false>
</field>
<field position="84" length-"20" protected= "true" numeric=" true" hidden=" false" reset="false" modified="false">            </field>
    <field position="105" length="73" protected= "true" numeric="true" hidden=" false" reset="false" modified="false">WELCOME TO IBM GLOBAL SERVICES </field>
    <field position="179" length="4" protected="true" numeric= "true" hidden="false" reset="false" modified="false">___</field>
    <field position="184" length="5" protected="true" numeric="true" hidden="false" reset="false" modified="false">RRR  </field>
    <field position="190" length="22" protected- false" numeric="false" hidden="false" reset="false" modified-"false">RESEARCH TRIANGLE PARK</field>
    <field position="213" length="44" protected=" true" numeric="true" hidden="false" reset="false" modified="false">_____.        </field>
    <field position="258" length="5" protected="true" numeric="true" hidden="false" reset="false" modified="false">/___</field>
    <field position="264" length="4" protected="true" numeric= "true" hidden="false" reset="false" modified="false">R   R</field>
    <field position="269" length="65" protected=" true" numeric="true" hidden="false" reset="false" modified="false">_____\\    </field>
    <field position="335" length="8" protected-" true" numeric=" true" hidden-"false" reset="false" modified="false">.___</field>
    <field position="344" length="9" protected=" true" numeric"true" hidden="false" reset="false" modified="false">RRR      III</field>
    <field position="354° length="59" protected=" true" numeric= "true" hidden="false" reset="false" modified="false">_____.        </field>
    <field position"414" length="9" protected= "true" numeric="true" hidden=" false" reset="false" modified="false">/_____ </field>
    <field position="424" length="9" protected="true" numeric= "true" hidden="false" reset="false" modifiedx"faise">R   R  I </field>
    <field position="434" length="11" protected="false" numeric="false" hidden=" false" reset="false" modified="false">INFORMATION</field>
    <field position="446" length="2" protected="true" numeric="true" hidden=" false" reset="false" modified="false">____</field>
    <field position="449" length="1" protected="false" numeric-" false" hidden="false" reset="false" modified="false">*</field>
    <field position="451" length-"38" protected="true" numeric="true" hidden="false" reset="false" modified="false">_____\\        </field>
```

FIG. 13B

```
<field position="490" length="13" protected="true" numeric,"true" hidden=" false"
reset"false" modified="false">_____</field>
    <field position"504" length="11" protected="true" numeric="true" hidden="false"
reset-"false" modified="false">R  R  I    </field>
    <field position="516" length="'11" protected-"true" numeric="true" hidden="false"
reset="false" modified="false">_____</field>
    <field position="528" length-"4" protected="false" numeric="false" hidden="false"
reset-"false" modified="false">****</field>
    <field position="533" length="35" protected="true" numeric="true" hidden="false"
reset="false" modified="false">_____           </field>
    <field position="569" length="21" protected="true" numeric="true" hidden-"false"
reset="false" modified="false">/_____      </field>
    <field position="591" length="8" protected="true" numeric"true" hidden="false"
reset="false" modified="false">1    SSS</field>
    <field position="600" length="6" protected="true" numeric="true" hidden"false"
reset="false" modified="false">_____</field>
    <field position="607" length"7" protected="false" numeric-false" hidden="false"
reset="false" modified="false">*******</field>
    <field position="615" length="50" protected="true" numeric="true" hidden="false"
reset="false" modified="false">_____/                </field>
<field position="646" length="23" protected"true" numeric="true" hidden="false"
reset="false" modified="false">._____    </field>
    <field position="670" length="9" protected="true" numeric="true" hidden="false"
reset="false" modified="false">III    S    </field>
    <field position="680" length-"7" protected=" false" numeric="false" hidden="false"
reset="false" modified="false">SYSTEMS</field>
    <field position="688" length="36" protected="true" numeric-"true" hidden="false"
reset="false" modified="false">._____               </field>
    <field position="725" length="30" protected="true" numeric="true" hidden="false"
reset="false" modified=.'false">/_____._____.____  </field>
    <field position="756" length="3" protected="true" numeric="true" hidden="false"
reset="false" modified="false">SSS</field>
    <field position="760" length"43" protected="true" numeric="true" hidden-"false"
reset"false" modified-"false">_____/       </field>
    <field position="804" length="34"" protected="false" numeric"false" hidden="false"
reset="false" modified="false">                    </field>
    <field position="839" length="4" protected="true" numeric="true" hidden="false"
reset="false" modified="false">S    </field>
    <field position="844" length=="39" protected="true" numeric="true" hidden="false"
reset="false" modified-false">_____    </field>
    <field position="884" length="5" protected="false" numeric="false" hidden="false"
reset="false" modified="false">    </field>
    <field position-"890" length="25" protected="true"  numeric="true" hidden="false"
reset="false" modified="false">                 </field>
    <field position="916" length-"8" protected="true" numeric="true" hidden"false"
reset="false" modified="false">SSS         </field>
    <field position="925" length="38" protected="true" numeric="true" hidden"false"
reset-"false" modified-"false">\_____/            </field>
```

FIG. 13C

```xml
<field position="964" length="43" protected="false" numeric="false" hidden="false" reset="false" mod.a,fied="false">                </field>
<field position="1008" length="36" protected="true" numeric="true" hidden="false" reset="false" modified="false">_____.    </field>
<field position="1044" length="10" protected="false" numeric="false" hidden="false" reset="false" modified="false"></field>
<field position="1046" length="157" protected="false" numeric="false" hidden="false" reset="false" modified="false">CUSTOMER SERVICE CENTER (T/L) 555-1212 / (515) 555-1212 </field>
<field position="7,204" length="157" protected="true" numeric="true" hidden-"false" reset="false" modified="false">    USE OF THIS SYSTEM IS FOR IBM MANAGEMENT APPROVED PURPOSES ONLY
</field>
<field position"1362" length="159" protected—"true" numeric=11true" hidden="false" reset"false" modified="false">Fill in your USERID and PASSWORD (which will not appear) and press ENTER.       If you are already logged on, enter LOGON userid HERE on the COMMAND line.   </field>
<field position"1522" length="13"    protected-"true" numeric="true" hidden="false" reset="false" modified="false">USERID   ===>:</field>
<field position="1536" length="8"    protected="false" numeric="false" hidden="false" reset="false" modified="false">     </field>
<field position="1545" length-"56" protected="true" numeric="true" hidden="false" reset="false" modified="false">                </field>
<field position="1602" length="13" protected="true" numeric="true" hidden="false" reset="false" modified="false">PASSWORD ===></field>
<field position="1616" length="8"   protected="false" numeric=•"false" hidden="true" reset"false" modified"false">        </field>
<field position="1625" length="136" protected="true" numeric="true" hidden="false" reset="false" modified="false">                </field>
<field position."1762" length="13" protected="tru@" numeric"true" hidden="false" reset="false" modified="false">COMMAND -==></field>
<field position="?.776" length="124" protected="false" numeric="false" hidden="false"
 reset="false" modified="false">
</field>
<field position="1901" length="20" protected="true" numeric="false" hidden="false" reset="false" modified="false">RUNNING   RALVMS     </field>
    </content>
    <interaction/>
   </screen>
</xml_host_data>
```

METHOD AND APPARATUS FOR REPRESENTING HOST DATASTREAM SCREEN IMAGE INFORMATION USING MARKUP LANGUAGES

BACKGROUND OF THE INVENTION

1. Technical Field

The present invention relates generally to an improved data processing system and, in particular, to a method and apparatus for representing screen data from a host computer using a markup language.

2. Description of Related Art

Some display devices that are used to present information from mainframe-type host computers have limited capabilities for displaying a user-friendly graphical user interface (GUI). These devices may have a graphic mode, but much of the information is text-only. A host datastream directed to a terminal connected to the host computer, e.g., IBM 3270 and 5250 terminals, typically describes a rectangular host screen image that can be viewed as a character-based structure of fields. The datastream is a shorthand representation for the screen containing both content and formatting attributes. For example, a sequence of 10 blank characters starting from position 100 is described by a repeat command followed by a starting position of 100, an ending position of 109, and a single blank character.

Other platforms that provide user-friendly graphical user interfaces may use host emulation software. However, the information that is received and sent must still conform to the format expected by the host computer. Parsing the host datastream is a major task of a typical host datastream emulation application.

Most emulators avoid redundant parsing by storing the resulting parsed information for later reference. The host screen image information and associated information is stored in an internal data structure or presentation space to support the rendering of the host screen image and the interactions between the two applications at the ends of the datastream.

Some previous solutions to the problems of creating a presentation space have used proprietary programming language structures. For example, Java-based emulation software may represent a presentation space using a Java object while a C-based emulation application represents the presentation space using C structures. Representing a presentation space in a proprietary programming language structure prevents the presentation information from being interchangeable in a multi-product, multi-language, or multi-tier environment.

Proprietary presentation spaces create difficulties in adopting different presentation styles. For example, in a server-based environment, the server can not share a presentation space with its clients. A client needs to establish a special purpose, proprietary communications protocol with the server. The client then requests that the server run a service written to the proprietary presentation space application programming interface (API) in order for the server to retrieve requested information that the client requires to continue its processing. These iterations add significant communications overhead.

Some previous solutions to the problems of creating a presentation space have chosen to duplicate a partial presentation space at the client. This may reduce the communications overhead but locks the application into a specific proprietary protocol and introduces other overhead for maintaining states for two presentation spaces.

In the case of GUI customization for host screens, some previous solutions have typically reconstructed the presentation space information in a proprietary database with additional customizing information for each host screen. The GUI software checks every host screen for matching customizing information in the database to convert it to a different presentation style and maps back user inputs and interactions to keystrokes in the original presentation space. This process incurs the overhead of reconstruction, definition, mapping, and remapping of the same host data in several data structures. Furthermore, the resulting presentation style is locked into a specific customized database that is difficult to migrate to different presentation styles.

In other solutions, an application typically needs to employ the legacy presentation space interfaces and formats. As has become apparent over the past few years, legacy systems may be costly, skill-dependent, and error-prone.

The previous solutions do not present host screen data in a commonly interchangeable format that is easily integrated with other applications and independent of presentation styles. Therefore, it would be advantageous to represent host screen image information in a manner, which is flexible, pervasive, and requires less programming effort. It would be further advantageous for the solution to adhere to open programming and open data standards.

SUMMARY OF THE INVENTION

The present invention provides a method and apparatus for representing host datastream screen image information using markup languages. A distributed data processing system contains a network, at least one host computer, at least one client computer, and optionally at least one server. The host computer generates a host datastream containing host screen image information and forwards the host datastream to a client. If the client is not directly connected to the host, then the host datastream may be routed to the client. The host datastream is converted to a markup language tagged datastream at some point within the network according to a Document Type Definition (DTD) authored for the purpose of representing information in host datastreams. The client receives the markup language tagged datastream containing the host screen image information derived from the host datastream and parses the markup language tagged datastream to identify the host screen image information. The host screen image information is displayed on a display device connected to the client, enabling the client to act as an emulator for the host.

BRIEF DESCRIPTION OF THE DRAWINGS

The novel features believed characteristic of the invention are set forth in the appended claims. The invention itself, however, as well as a preferred mode of use, further objectives and advantages thereof, will best be understood by reference to the following detailed description of an illustrative embodiment when read in conjunction with the accompanying drawings, wherein:

FIGS. 10A–10E are sections of a DTD (Data Type Definition) file that provides an example of a set of tags that allows the representation of a host screen image in XML;

FIG. 12 is an example of a raw host datastream; and

FIGS. 13A–13C are examples of an XML datastream

DETAILED DESCRIPTION OF THE PREFERRED EMBODIMENT

Figure 1:
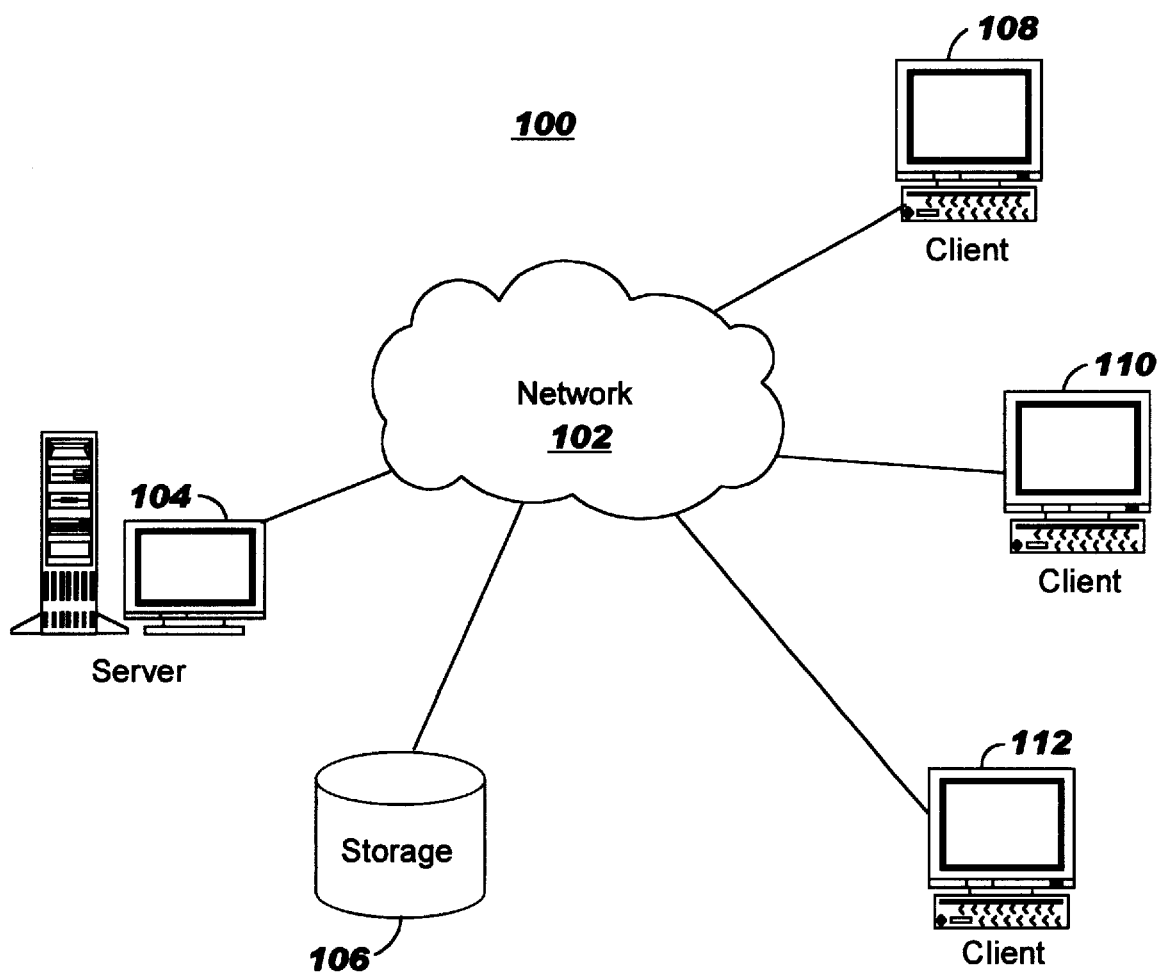
FIG. 1 depicts a pictorial representation of a distributed data processing system in which the present invention may be implemented.

With reference now to the figures, FIG. 1 depicts a pictorial representation of a distributed data processing system in which the present invention may be implemented. Distributed data processing system 100 is a network of computers in which the present invention may be implemented. Distributed data processing system 100 contains a network 102, which is the medium used to provide communications links between various devices and computers connected together within distributed data processing system 100. Network 102 may include permanent connections, such as wireless systems and wire or fiber optic cables, or temporary connections made through telephone connections.

In the depicted example, a server 104 is connected to network 102 along with storage unit 106. In addition, clients 108, 110, and 112 also are connected to a network 102. These clients 108, 110, and 112 may be, for example, personal computers or network computers. For purposes of this application, a network computer is any computer, coupled to a network, which receives a program or other application from another computer coupled to the network. In the depicted example, server 104 provides data, such as boot files, operating system images, and applications to clients 108–112. Clients 108, 110, and 112 are clients to server 104. Distributed data processing system 100 may include additional servers, clients, host computers, and other devices not shown. In the depicted example, distributed data processing system 100 is the Internet with network 102 representing a worldwide collection of networks and gateways that use the TCP/IP suite of protocols to communicate with one another. At the heart of the Internet is a backbone of high-speed data communication lines between major nodes or host computers, consisting of thousands of commercial, government, educational and other computer systems that route data and messages. Of course, distributed data processing system 100 also may be implemented as a number of different types of networks, such as for example, an intranet, a local area network (LAN), or a wide area network (WAN). FIG. 1 is intended as an example, and not as an architectural limitation for the present invention.

Figure 2:
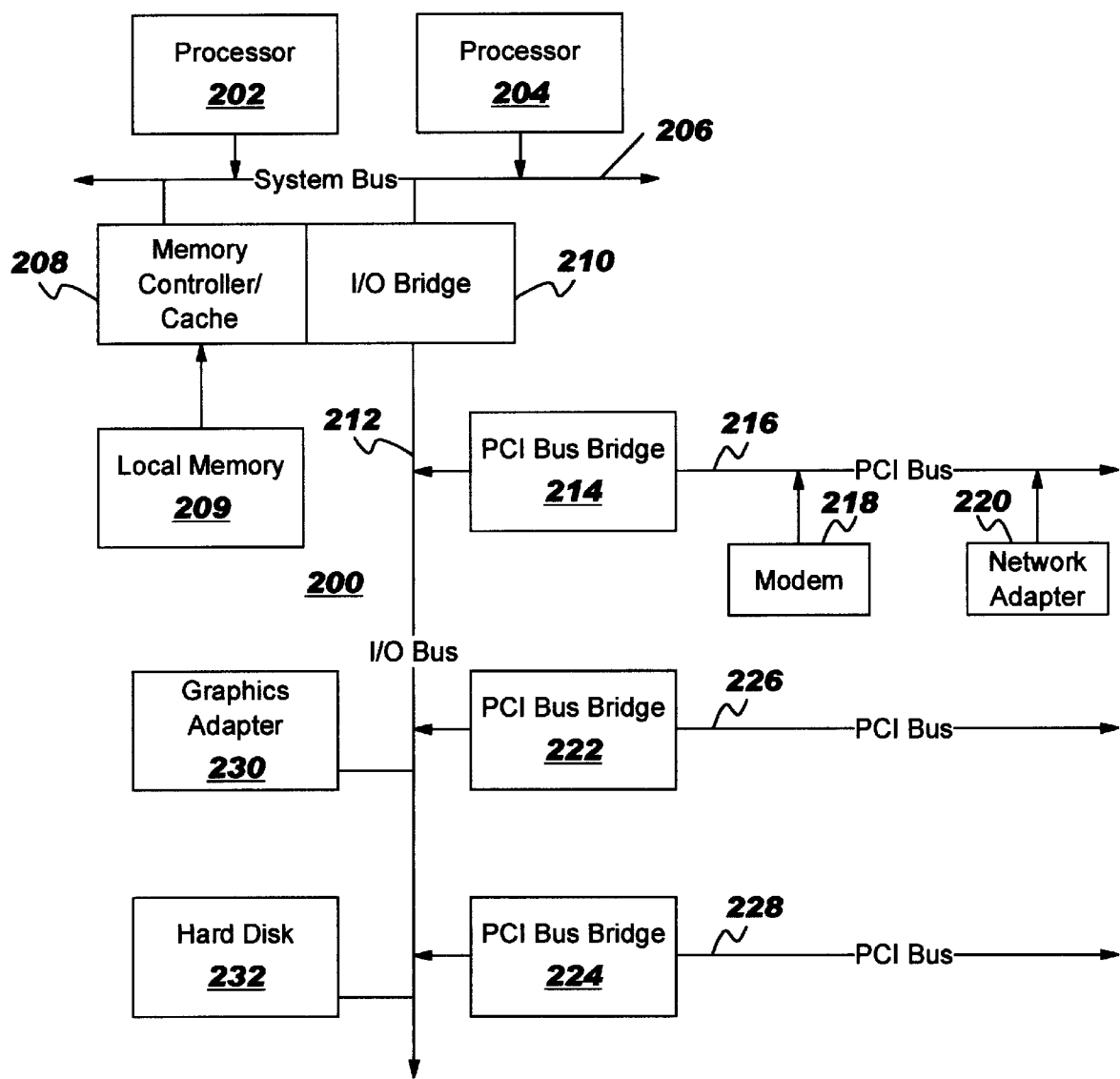
FIG. 2 depicts a data processing system that may be implemented as a server.

With reference now to FIG. 2, a block diagram depicts a data processing system that may be implemented as a server, such as server 104 in FIG. 1, in accordance with a preferred embodiment of the present invention. Data processing system 200 may be a symmetric multiprocessor (SMP) system including a plurality of processors 202 and 204 connected to system bus 206. Alternatively, a single processor system may be employed. Also connected to system bus 206 is memory controller/cache 208, which provides an interface to local memory 209. I/O bus bridge 210 is connected to system bus 206 and provides an interface to I/O bus 212. Memory controller/cache 208 and I/O bus bridge 210 may be integrated as depicted.

Peripheral component interconnect (PCI) bus bridge 214 connected to I/O bus 212 provides an interface to PCI local bus 216. A number of modems may be connected to PCI bus 216. Typical PCI bus implementations will support four PCI expansion slots or add-in connectors. Communications links to network computers 108–112 in FIG. 1 may be provided through modem 218 and network adapter 220 connected to PCI local bus 216 through add-in boards.

Additional PCI bus bridges 222 and 224 provide interfaces for additional PCI buses 226 and 228, from which additional modems or network adapters may be supported. In this manner, server 200 allows connections to multiple network computers. A memory-mapped graphics adapter 230 and hard disk 232 may also be connected to I/O bus 212 as depicted, either directly or indirectly.

Those of ordinary skill in the art will appreciate that the hardware depicted in FIG. 2 may vary. For example, other peripheral devices, such as optical disk drives and the like, also may be used in addition to or in place of the hardware depicted. The depicted example is not meant to imply architectural limitations with respect to the present invention.

The data processing system depicted in FIG. 2 may be, for example, an IBM RISC/System 6000 system, a product of International Business Machines Corporation in Armonk, N.Y., running the Advanced Interactive Executive (AIX) operating system.

Figure 3:
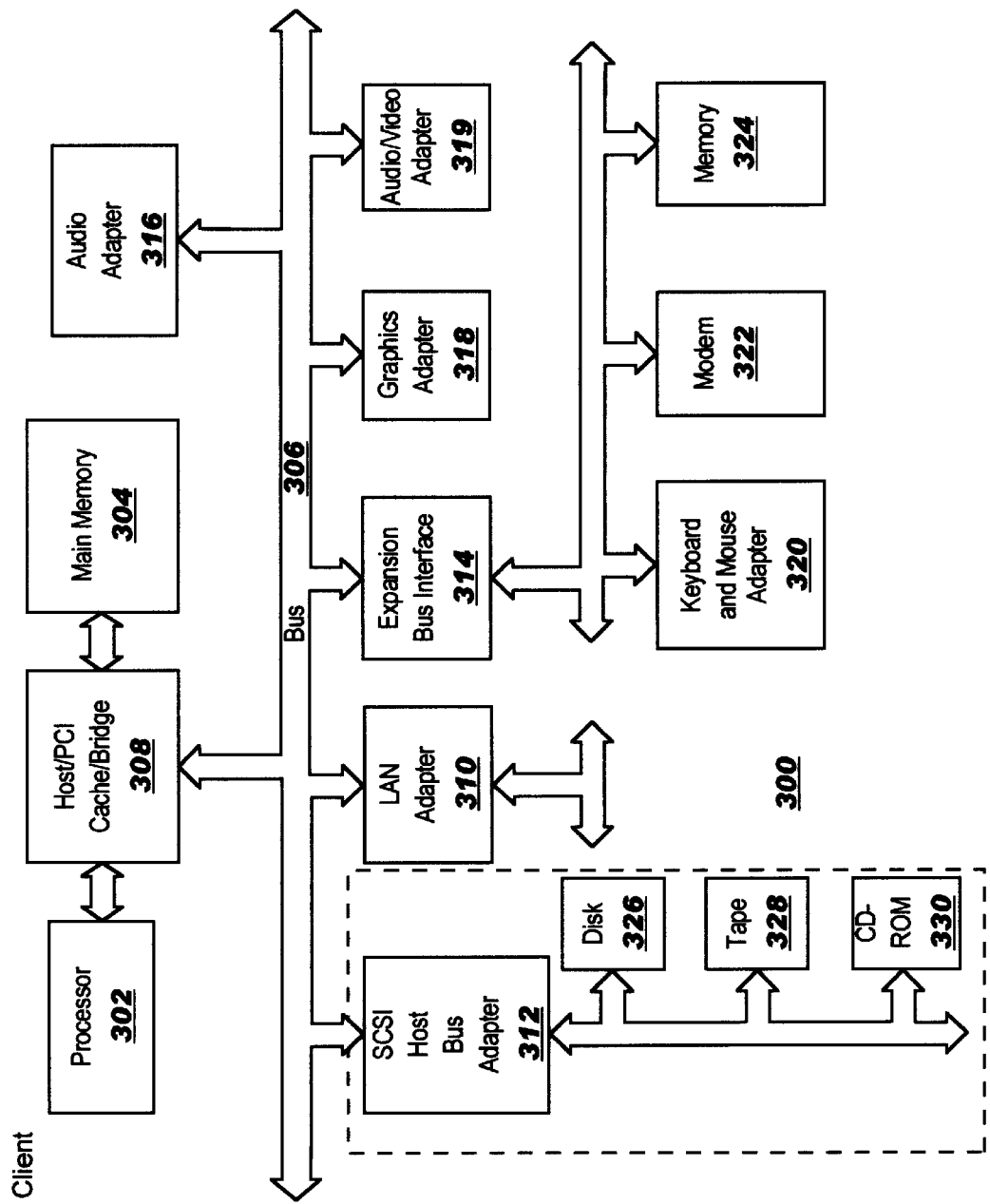
FIG. 3 depicts a data processing system that may be implemented as a client.

With reference now to FIG. 3, a block diagram illustrates a data processing system in which the present invention may be implemented. Data processing system 300 is an example of a client computer, such as client 108 in FIG. 1. Data processing system 300 employs a peripheral component interconnect (PCI) local bus architecture. Although the depicted example employs a PCI bus, other bus architectures such as Micro Channel and ISA may be used. Processor 302 and main memory 304 are connected to PCI local bus 306 through PCI bridge 308. PCI bridge 308 also may include an integrated memory controller and cache memory for processor 302. Additional connections to PCI local bus 306 may be made through direct component interconnection or through add-in boards. In the depicted example, local area network (LAN) adapter 310, SCSI host bus adapter 312, and expansion bus interface 314 are connected to PCI local bus 306 by direct component connection. In contrast, audio adapter 316, graphics adapter 318, and audio/video adapter 319 are connected to PCI local bus 306 by add-in boards inserted into expansion slots. Expansion bus interface 314 provides a connection for a keyboard and mouse adapter 320, modem 322, and additional memory 324. SCSI host bus adapter 312 provides a connection for hard disk drive 326, tape drive 328, and CD-ROM drive 330. Typical PCI local bus implementations will support three or four PCI expansion slots or add-in connectors.

An operating system runs on processor 302 and is used to coordinate and provide control of various components within data processing system 300 in FIG. 3. The operating system may be a commercially available operating system such as OS/2, which is available from International Business Machines Corporation. "OS/2" is a trademark of International Business Machines Corporation. An object oriented programming system such as Java may run in conjunction with the operating system and provides calls to the operating system from Java programs or applications executing on data processing system 300. "Java" is a trademark of Sun Microsystems, Inc. Instructions for the operating system, the object-oriented operating system, and applications or programs are located on storage devices, such as hard disk drive 326, and may be loaded into main memory 304 for execution by processor 302.

Those of ordinary skill in the art will appreciate that the hardware in FIG. 3 may vary depending on the implementation. Other internal hardware or peripheral devices, such as flash ROM (or equivalent nonvolatile memory) or optical disk drives and the like, may be used in addition to or in place of the hardware depicted in FIG. 3. Also, the processes of the present invention may be applied to a multiprocessor data processing system.

For example, data processing system 300, if optionally configured as a network computer, may not include SCSI host bus adapter 312, hard disk drive 326, tape drive 328, and CD-ROM 330, as noted by dotted line 332 in FIG. 3 denoting optional inclusion. In that case, the computer, to be properly called a client computer, must include some type of network communication interface, such as LAN adapter 310, modem 322, or the like. As another example, data processing system 300 may be a stand-alone system configured to be bootable without relying on some type of network communication interface, whether or not data processing system 300 comprises some type of network communication interface. As a further example, data processing system 300 may be a Personal Digital Assistant (PDA) device which is configured with ROM and/or flash ROM in order to provide non-volatile memory for storing operating system files and/or user-generated data.

The present invention provides a method for transferring datastreams in particular formats across a distributed data processing system. The depicted example in FIG. 3 and above-described examples are not meant to imply architectural limitations. The present invention may be implemented on a variety of servers, clients, and host computers as described with FIG. 1.

The present invention provides a method of representing host screen images using a markup language to markup screen data by contents, attributes, and interactions. Although the examples are provided using XML (eXtensible Markup Language), it is contemplated that some other markup languages that are compatible with the Standard Generalized Markup Language (SGML) family of languages may be used to implement the present invention. However, the SGML-compatible language must offer tag definitions through Data Type Definition (DTDs) support so that the syntax and meaning of the tags within the system may be flexible changed. For example, although Hypertext Markup Language (HTML) is within the SGML family of languages, it does not offer the flexibility required by the present invention.

More information about XML may be found in DuCharme, *XML: The Annotated Specification*, January 1999, herein incorporated by reference.

A host datastream is parsed once into an XML format that is interchangeable with any application. A set of tags are defined to store the field structure and character attributes of the host screen image with its data content in single data unit.

Host emulation software implementing the method of the present invention may optionally generate an XML format after it has processed an outbound host datastream, i.e. a host datastream directed from a host to a client. Host emulation software implementing the method of the present invention may also accept XML-formatted input to generate an inbound host datastream, i.e. a host datastream directed from a client to a host.

Host emulation software implementing the method of the present invention may also receive XML datastreams directly from host applications. The XML datastreams are received either via a conversion program that converts host datastreams to XML datastreams for legacy applications or from newly written host applications that are able to generate XML datastreams directly.

Examples of these different embodiments of the present invention using different configurations of distributed data processing systems are described below with respect to FIGS. 4–7.

Figure 4:
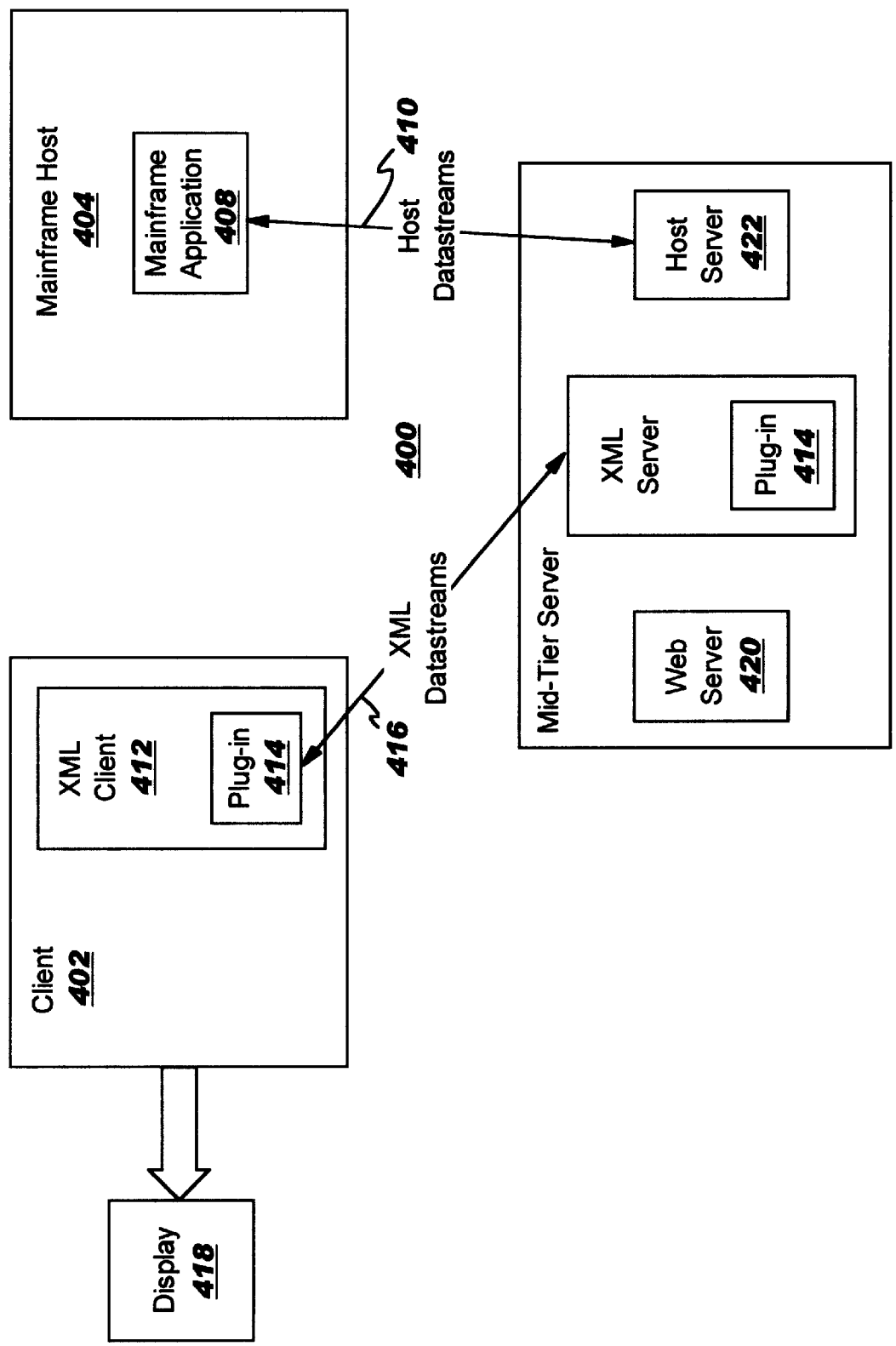
FIG. 4 is a block diagram depicting a distributed data processing system comprising a server that contains a mid-tier converter for converting a host datastream to an XML datastream.

With reference now to FIG. 4, a block diagram depicts a distributed data processing system comprising a server that contains a mid-tier converter for converting a host datastream to an XML datastream and from an XML datastream to a host datastream. Distributed data processing system 400 contains client computer 402, mainframe host computer 404, and mid-tier server computer 406. Mainframe host computer 404 executes mainframe application 408 that generates host datastream 410 addressed to client 402. XML client 412 executing on client 402 has plug-in 414 that accepts XML datastream 416 and generates XML datastreams to be returned to mainframe host computer 404. Client 402 accepts XML datastream 416, processes the XML datastream using XML client 412 and plug-in 414, and generates a display to be shown on display device 418. Client 402 can accept inputs from a user such that client 402 emulates an interface to mainframe host computer 404.

Host datastream 410 is routed through mid-tier server 406 before being routed to client 402 as XML datastream 416. Mid-tier server 406 may support an optional Web server 420 that provides access to Web pages, etc. Host server 422 executing on mid-tier server 406 accepts host datastream 410. Host server 422 may provide input/output support and appropriate application programming interfaces (APIs) that are used by other software components on mid-tier server 406. Plug-in 424 executing within XML server 426 accesses or retrieves data comprising the content of host datastream 410 and converts the content into an appropriately tagged XML datastream that is forwarded to client 402. In this example, mid-tier server 406 provides a communication path between mainframe application 408, which is only able to generate and understand host-formatted datastreams, and XML client 412, which is only able to generate and understand XML-formatted datastreams.

Figure 5:
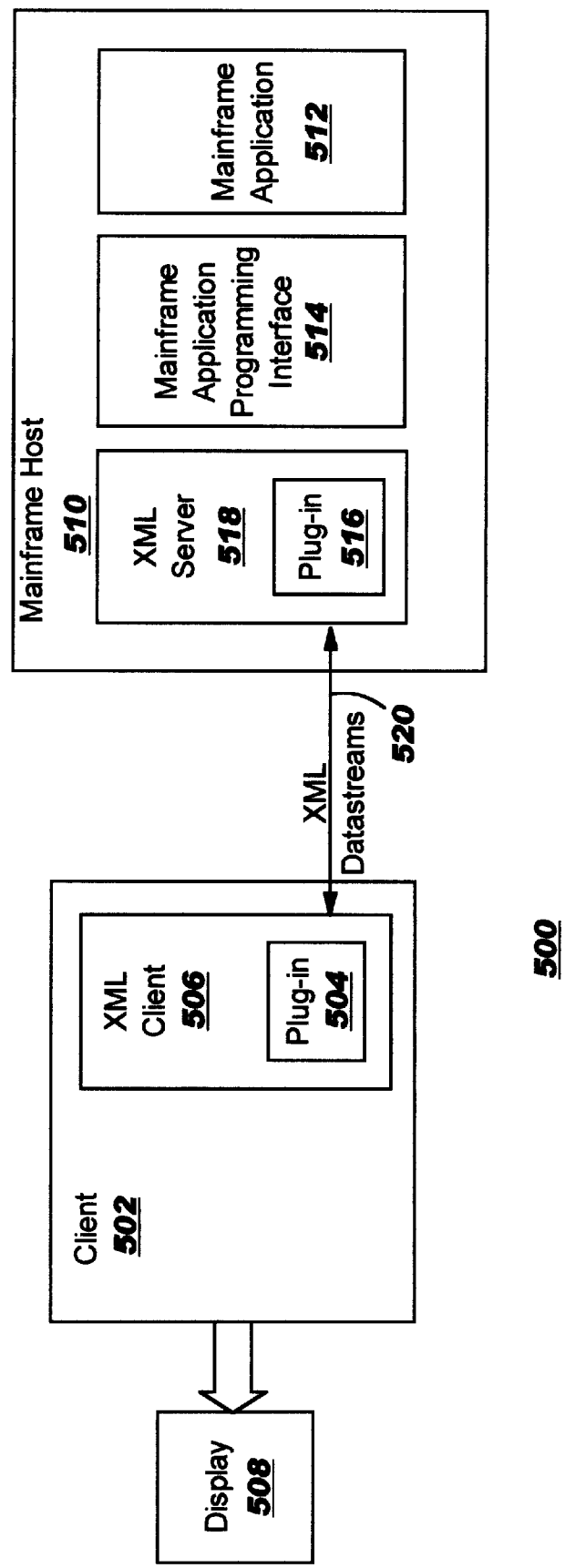
FIG. 5 is a block diagram depicting a distributed data processing system containing a client and mainframe whose applications communicate by means of XML datastreams without modifying the applications to understand XML datastreams.

With reference now to FIG. 5, a block diagram depicts a distributed data processing system containing a client and mainframe hose applications communicate by means of XML datastreams without modifying the applications themselves to understand XML datastreams. Data processing system 500 contains client 502 and mainframe host 510. Client 502 has plug-in 504 that executes within XML client 506 to generate displays to a user on display device 508.

Mainframe host computer 510 has mainframe application 512 that generates data to be used by the user of client 502. Mainframe application 512 provides data through mainframe application programming interface 514 that contains functions and methods used by plug-in 516 executing within XML server 518. XML server 518 accepts datastreams from mainframe applications and converts those datastreams to XML datastreams 520 that are forwarded to XML client 506 on client 502. In this example, existing host or mainframe applications may produce datastreams on the mainframe without regard to the destination client's ability to translate a host datastream. An XML server may be created to execute on the mainframe host in order to intercept and convert datastreams from the mainframe applications to newly deployed XML clients within the distributed data processing system.

Figure 6:
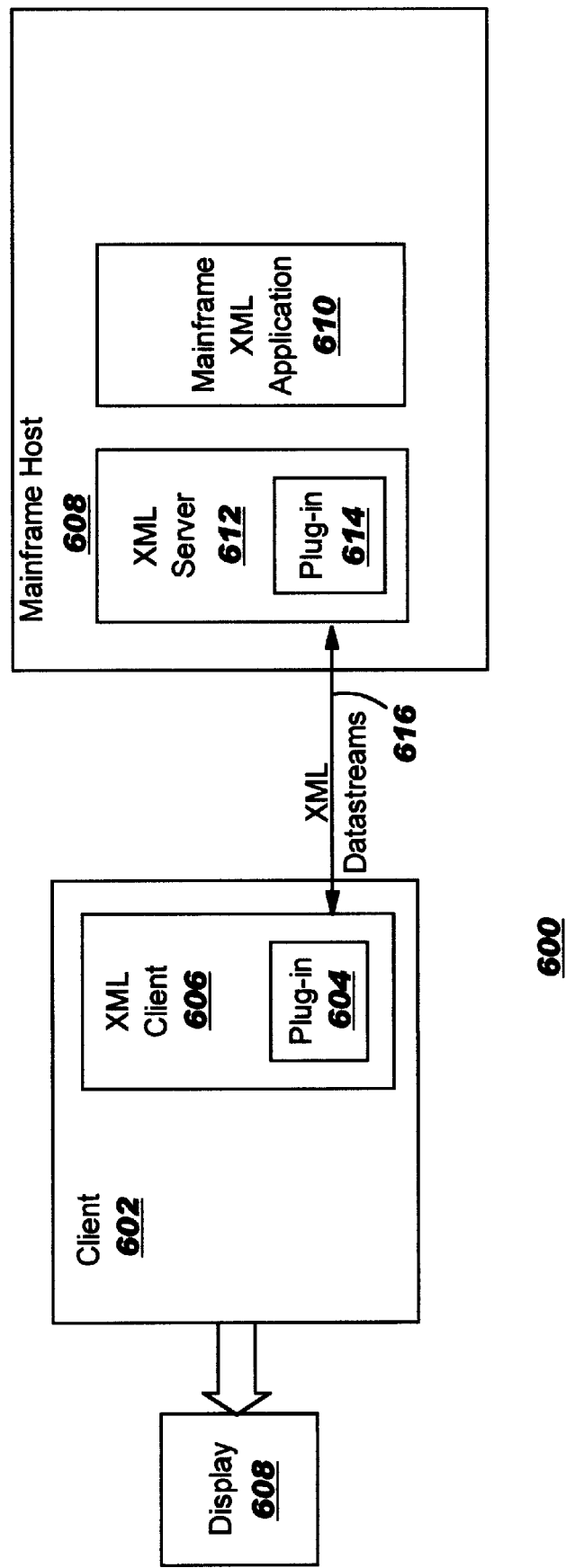
FIG. 6 is a block diagram depicting a distributed data processing system that has a client computer that accepts XML datastreams from a mainframe application executing on a mainframe host computer in which the mainframe application generates an XML datastream.

With reference now to FIG. 6, a block diagram depicts a distributed data processing system that has a client computer that accepts XML datastreams from a mainframe application executing on a mainframe host computer in which the mainframe application generates an XML datastream Distributed data processing system 600 has client computer 602 executing plug-in 604 within XML client 606 to generate presentation data for a user on display device 608. Mainframe host 608 supports mainframe XML application 610 that generates a datastream addressed to client 602. In this example, mainframe XML application 610 generates an XML datastream that is accepted by plug-in 614 within XML server 612 and forwarded to XML client 606 as XML datastream 616. In this example, new mainframe host applications may be deployed that are XML-savvy, and these applications may use an XML host data parser and generator in accordance with a preferred embodiment of the present invention.

Figure 7:
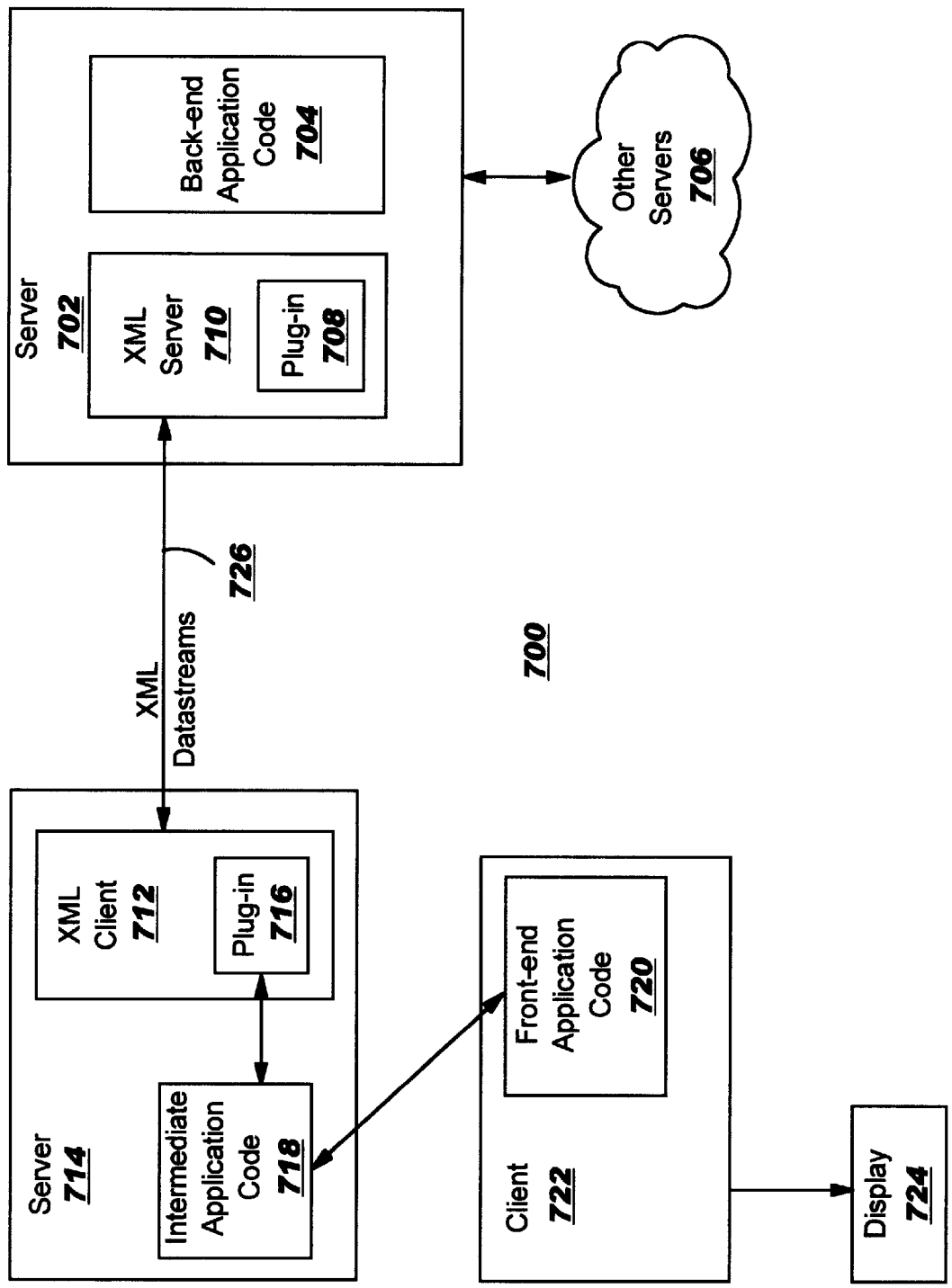
FIG. 7 is a block diagram depicting a distributed data processing system with a network of servers that may employ the representation of screen images using the datastream to XML conversion.

With reference now to FIG. 7, a block diagram depicts a distributed data processing system that has a network of servers that may employ the representation of screen images using the datastream to XML conversion. Server 702 executes backend user application 704 that may provide a variety of transaction services or other enterprise applications. Server 702 may communicate with other servers 706 within distributed data processing system 700. Backend user code 704 generates a datastream that is accepted by plug-in 708 executing within XML server 710 that forwards XML datastream 726 to XML client 712 executing within server 714. Plug-in 716 executing within XML client 712 may interface with intermediate application code 718. Intermediate application code 718 may act as a server to front-end application code 720 executing within client 722. Front-end application code 720 may be similar to intermediate application code 718 such that the origin or destination of a transaction between the two applications determines which application has a clients-side perspective and which application has a server-side perspective. Client 722 then provides support for front-end application code 720 to display application presentation data on display device 724.

Figure 8:
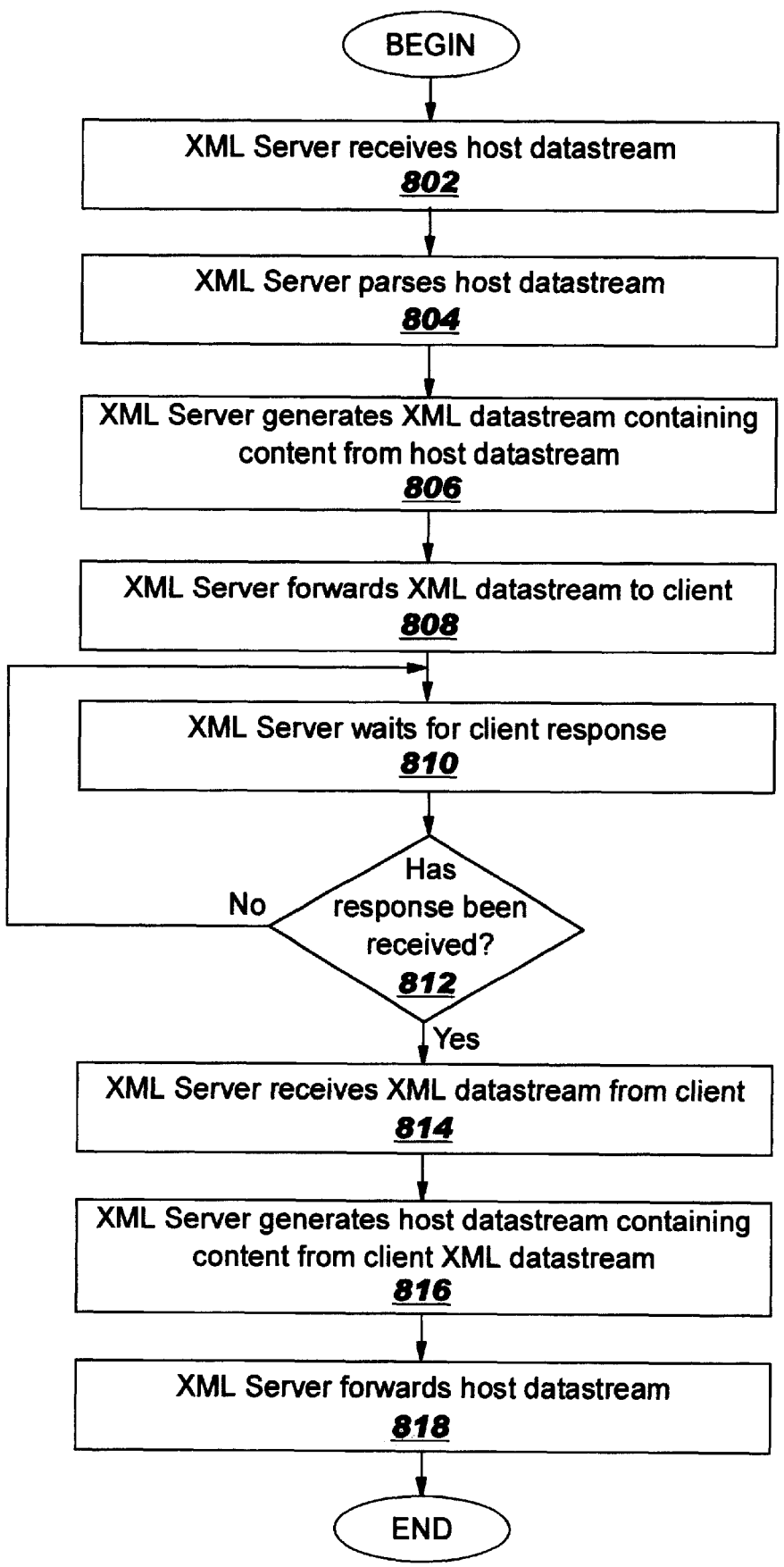
FIG. 8 is a flowchart depicting a process within an XML server for receiving and forwarding host datastreams and XML datastreams.

With reference now to FIG. 8, a flowchart depicts a process within an XML server for receiving and forwarding host datastreams and XML datastreams. The process begins when the XML server receives a host datastream (step 802). The XML server parses the host datastream (step 804) and generates an XML datastream that is properly tagged with the content from the host datastream (step 806). The XML server forwards the XML datastream to the appropriate client (step 808) and waits for the client to respond (step 810). A determination is then made as to whether a response has been received from a client (step 812). If not, then the process returns to step 810 to continue waiting for a client response. The XML server then receives the XML datastream from the client (step 814). The XML server then generates a host datastream that contains the content from the XML datastream received from the client (step 816). The XML server then forwards the newly generated XML datastream to the host (step 818). Steps 802–818 constitute an essentially non-terminating loop in which the XML server processes datastream traffic between the host and the client. In an alternative process, the XML server may continue processing other datastreams rather than waiting for a particular response from a particular client. In other words, the XML server may process multiple datastreams in parallel and asynchronously.

Figure 9:
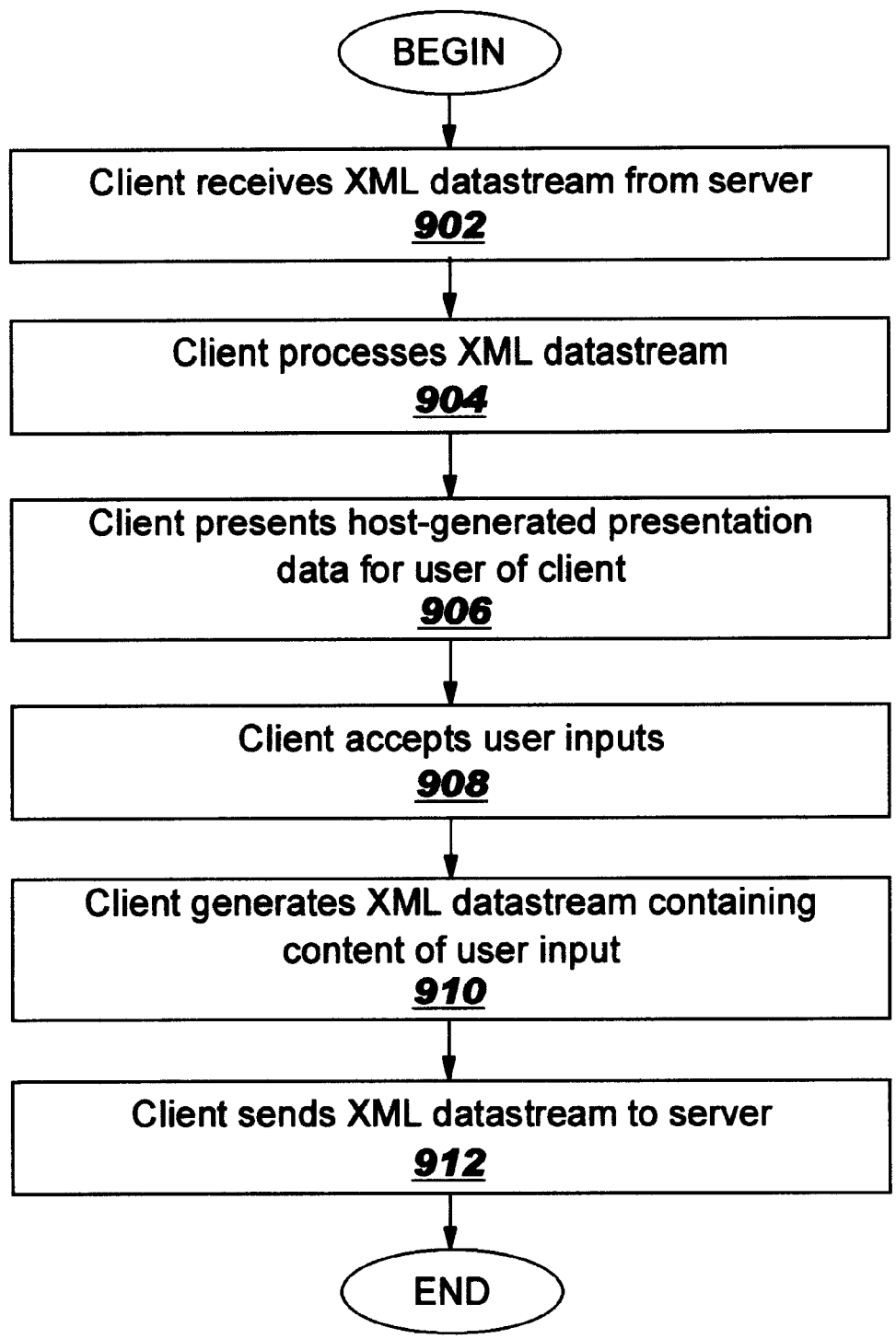
FIG. 9 is a flowchart depicting the processing used by a client to receive an XML datastream and respond with a newly generated XML datastream to the server.

With reference now to FIG. 9, a flowchart depicts the processing used by a client to receive an XML datastream and respond with a newly generated XML datastream to the server. The process begins when the client receives an XML datastream from the server (step 902). The client parses and processes the XML datastream (step 904) and presents the host-generated presentation data to the user of the client (step 906). The client then accepts any inputs from the user concerning the host data (step 908) and generates an XML datastream containing the content of the user input (step 910). The client then sends the XML datastream to the server so that the server may forward the XML datastream to the host computer (step 912).

There are many advantages to using the methods of the present invention.

Host screen images stored in the XML format can be accessed directly by different software components implemented in different languages without regard to language compatibility issues, which facilitates integration of XML-based host data sources with other data sources.

XML-based host screen images can be easily customized to different display formats by applying different display stylesheets or rendering engines. For example, with a browser supporting XML and eXtensible Stylesheet Language (XSL), the host screen image can be displayed directly inside the browser without any programming effort. Different style sheets may be adopted by particular users as a preference option. XML is also an ideal format for storing the host image as an intermediate format for future processing or as a format for servers to exchange data.

An important point is host datastreams need only be processed once on a given system The commonly understood XML format may be forwarded around the network for use by other applications, which may include but are not limited to: data source integration, presentation customization, distributed processing, and/or conventional host data entry processing. A distinct advantage of using XML is that little semantic meaning is lost in the conversion from a host datastream to an XML datastream.

Although portions of a distributed data processing system may implement the above described methods as stand-alone applications or software components, in order to deploy a complete, distributed, data processing system that implements various aspects of the present invention, the following components are desirable: a set of tags for assignment to a representation of host screen images; software components for parsing or generating XML-based host screen image datastreams; common transport across a network; and host to XML datastream conversion.

With reference now to FIGS. 10A–10E, a DTD (Data Type Definition) file provides an example of a set of tags that allows the representation of a host screen image in XML. A DTD is a grammar that describes what tags and attributes are valid in an XML document or datastream that refers to the DTD and in what context the tags and attributes are valid. An attribute is a name="value" pair that can be placed in the start tag of an element. In the present invention, the set of tags in the DTD provides meaning to the data, which represents the field structure of the host screen.

The DTD shown in FIG. 10A–10E separates the information representing a host screen image into two parts: session information and screen information. The "Session" element delimited by the tag-pair "<session> </session>" contains information about the host session, such as host session ID, host type, host name, host port number, and host session screen size. The session information is originated from initiation parameters sent to the converter or from a client connecting to an XML application directly. The "Screen" element delimited by the tag-pair "<screen> </screen>" is the main element describing both the contents and attributes for a host screen image and contains three sub-elements: content, interaction, and display.

The "content" element describes the detailed information about the host screen fields including both text content and text attributes (for example, field start position, length, protected or unprotected, field text, etc.).

The "interaction" element specifies an inbound function key (i.e., a function key that may request some type of processing from the host within the emulator environment) or hints from outbound for expected inbound responses (i.e., a small amount of information from the host on expected input from a user within the emulator environment).

The "display" element stores the host-application-generated screen-display-related information, such as background and foreground color. The advantage of separating out the display information is that it facilitates filtering the display information when only the host screen content is requested, which saves potential processing and transmission overhead. With this set of tags, content and formatting attributes of host screen images are preserved in a common format that is available to any application for further processing without dependence on special purpose programming interfaces, such as EHLLAPI (Emulator High-Level Language API, which is a C-based API for writing emulator applications) and HACL (Host Access Class Library, which is an API to create Host Access Java Beans running on top of HACL provided within the Host On-Demand or HOD software platform environment). A client-side application interacts with host applications directly via the interaction tags. Screens can be bookmarked easily for further processing, such as off-line transactions. The presentation style is totally independent of the original host application designated attributes.

Figure 11:
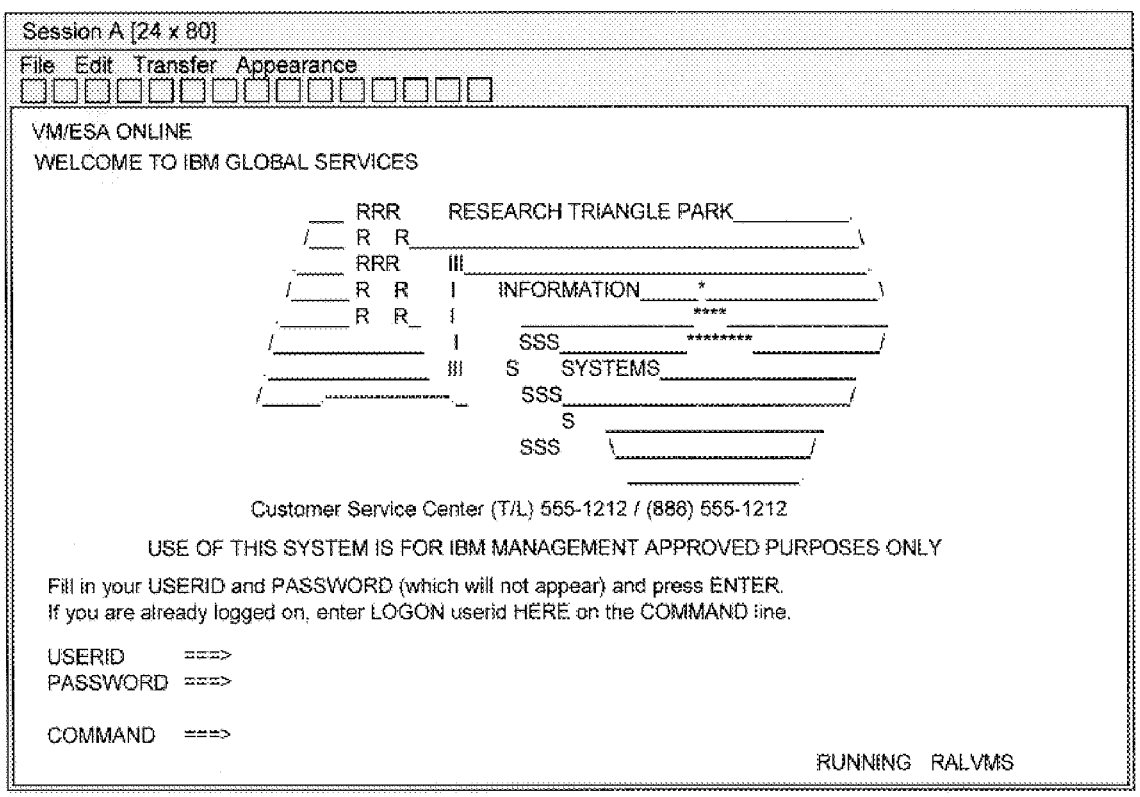
FIG. 11 is a graphical representation of a screen snapshot that show a window presented to a user of a client computer that is running an emulator application connected to a host computer.

With reference now to FIG. 11, a graphical representation of a screen snapshot shows a window presented to a user of a client computer that is running an emulator application connected to a host computer. In this example, the client computer is an IBM PC-compatible personal computer running an application under Microsoft Windows™. The client has formatted the host datastream into an XML datastream before presenting the host screen image, which in this example is a login screen.

With reference now to FIG. 12, an example of a raw host datastream is shown. Host datastream 1200 is the raw unprocessed, unparsed data that would be received by an XML client from a host-based application. In this example, the content of host datastream 1200 is a portion of the login screen content shown in the emulator window in FIG. 11. Host datastream 1200 has command 1202 that informs an application to write the datastream to the display device. Order 1204 sets the display buffer address to coordinate "C1D1". Order 1206 starts a field at the given point with a field attribute value equal to "F8". Content portion 1208 specifies the content of a field with its character values in brackets immediately beneath.

With reference now to FIGS. 13A–13C, an example of an XML datastream is shown. The content of the XML datastream is the login screen content shown in the emulator window in FIG. 11 after parsing and tagging the raw host datastream shown in FIG. 12.

In addition to the set of tags, two software components provide facilities for the conversion of the XML-based representation into a programming language's data structure for application development. The two additional elements are an XML-based host screen image parser and generator. The parser parses the XML representation and transforms it into an object tree that holds its information. The generator performs the reverse function by generating the XML-form of the host screen image from the object tree. These provide a different programming interface than special purpose programming interfaces such as EHLLAPI and HACL, which are usually employed in prior art systems to obtain the presentation space information containing host screen images.

The XML datastreams are directly accessible to applications that incorporate the parser and the generator as convenience tools to simplify the programming effort. Parsers and generators are generally well known in the art for parsing and generating markup languages. The parser provides one with the ability to extract the host screen image from the XML data and perform some type of processing. The generator gives one the ability to generate the XML-based form and forward it to another software component for further processing.

The XML datastreams can be forwarded across the network of a distributed data processing system through a common transport mechanism over sockets. The transport is generally used symmetrically at both ends of the application stream. The mechanism automatically wraps XML datastreams into socket stream objects and optionally applies an XML host data parser and generator to transmit an object tree from end-to-end in the application stream.

The XML datastreams can be generated directly by an application or converted to or from a host datastream by an existing host application. A host-XML datastream converter establishes a session with the host application and converts one type of datastream to the other bi-directionally. The converter can be an integral part of the emulation software to enhance its capability. The converter may appear in various forms, as shown with respect to FIGS. 4–7: it may be wrapped as a JavaBean to interact with an HOD session bean or may take the form of a plug-in to a client server, host server (e.g., tn3270/5250 server), or host application to enhance their communications capabilities.

The advantages of the present invention should be apparent in light of the detailed description. Previous solutions have used a language specific data structure to represent the host screen image. Sharing, formatting, and integration of the presentation space information have been done through specific software written to a specific interface. This approach has the disadvantages of requiring extra programming redundancies and efforts and of being non-pervasive and inflexible. This present invention uses a common XML format to represent the host screen image, which makes the host screen image information interchangeable and easy to share. Reduced programming effort is required as knowledge of markup languages becomes more available. Customizing the display of the host screen image is flexible. Application designers merely supply different display style sheets to show different looks for the host screen image. Integration with other data sources is pervasive and follows a common XML standard. Host-based data processing is much easier with more direct availability of to the host-generated data.

It is important to note that while the present invention has been described in the context of a fully functioning data processing system, those of ordinary skill in the art will appreciate that the processes of the present invention are capable of being distributed in the form of a computer readable medium of instructions and a variety of forms and that the present invention applies equally regardless of the particular type of signal bearing media actually used to carry out the distribution. Examples of computer readable media include recordable-type media such a floppy disc, a hard disk drive, a RAM, and CD-ROMs and transmission-type media such as digital and analog communications links.

The description of the present invention has been presented for purposes of illustration and description, but is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. A method for processing a host datastream from a server to a client in a distributed data processing system, the method comprising the computer-implemented steps of:

receiving, at the server, a host datastream comprising host screen image information;

generating an XML datastream comprising the host screen image information; and sending the XML datastream to the client.

2. The method of claim 1 wherein the XML datastream comprises a session element and a screen element.

3. The method of claim 2 wherein the session element comprises session subelements describing characteristics of a session between the client and a host.

4. The method of claim 3 wherein the session subelements comprise data specifying a host name.

5. The method of claim 3 wherein the session subelements comprise data specifying a session name.

6. The method of claim 3 wherein the session subelements comprise data specifying descriptive information for the session.

7. The method of claim 3 wherein the session subelements comprise a session identifier.

8. The method of claim 2 wherein the screen element comprises screen subelements describing content for a host screen image.

9. The method of claim 8 wherein the screen subelements comprise field elements specifying textual content.

10. The method of claim 8 wherein the screen subelements comprise interaction elements specifying actions directed from the client to a host.

11. The method of claim 1 wherein the host datastream is formatted for an IBM 3270 terminal.

12. The method of claim 1 wherein the host datastream is formatted for an IBM 5250 terminal.

13. A method for emulating a host computer on a client in a distributed data processing system, the method comprising the computer-implemented steps of:

receiving, at the client, an XML datastream comprising host screen image information derived from a host datastream;

parsing the XML datastream to identify the host screen image information; and displaying the host screen image information on a display device connected to the client.

14. The method of claim 13 further comprising:

in response to receiving user input at the client, generating an XML datastream comprising the user input as an action element; and forwarding the XML datastream to a host computer in the data processing system.

15. The method of claim 13 wherein the XML datastream comprises a session element and a screen element.

16. The method of claim 13 wherein the client is a personal digital assistant device.

17. The method of claim 13 wherein the client forwards the host screen image information to a personal digital assistant device.

18. A method for processing a host datastream between a server and a client in a distributed data processing system, the method comprising the computer-implemented steps of:

receiving, at the server, a first host datastream comprising host screen image information;

generating a first XML datastream comprising the host screen image information;

sending the first XML datastream to the client;

receiving, from the client, a second XML datastream comprising host-bound input information;

generating a second host datastream comprising the host-bound input information; and forwarding the second host datastream to a host.

19. A distributed data processing system comprising:

a network;

a host computer, wherein the host computer generates a host datastream comprising host screen image information and sends the host datastream to a client;

a client, wherein the client receives an XML datastream comprising the host screen image information derived from the host datastream and parses the XML datastream to identify the host screen image information; and a display device connected to the client, wherein the display device displays the host screen image information.

20. The distributed data processing system of claim 19 further comprising:

an intermediate server, wherein the intermediate server receives the host datastream and generates the XML datastream containing the host screen image information in the received host datastream.

21. The distributed data processing system of claim 19 wherein the XML datastream comprises a session element and a screen element.

22. A data processing system for processing a host datastream from a server to a client, the data processing system comprising:

receiving means for receiving, at the server, a host datastream comprising host screen image information;

generating means for generating an XML datastream comprising the host screen image information; and sending means for sending the XML datastream to the client.

23. The data processing system of claim 22 wherein the XML datastream comprises a session element and a screen element.

24. The data processing system of claim 23 wherein the session element comprises session subelements describing characteristics of a session between the client and a host.

25. The data processing system of claim 22 wherein the screen element comprises screen subelements describing content for a host screen image.

26. A data processing system for emulating a host computer on a client in a distributed data processing system, the data processing system comprising:

receiving means for receiving, at the client, an XML datastream comprising host screen image information derived from a host datastream;

parsing means for parsing the XML datastream to identify the host screen image information; and displaying means for displaying the host screen image information on a display device connected to the client.

27. The data processing system of claim 26 wherein the XML datastream comprises a session element and a screen element.

28. A computer program product on a computer readable medium for use in a data processing system for processing a host datastream from a server to a client, the computer program product comprising:

first instructions for receiving, at the server, a host datastream comprising host screen image information;

second instructions for generating an XML datastream comprising the host screen image information; and third instructions for sending the XML datastream to the client.

29. A computer program product on a computer readable medium for use in a data processing system for emulating a host computer on a client in a distributed data processing system, the computer program product comprising:

first instructions for receiving, at the client, an XML datastream comprising host screen image information derived from a host datastream;

second instructions for parsing the XML datastream to identify the host screen image information; and third instructions for displaying the host screen image information on a display device connected to the client.

* * * * *